Dec. 6, 1938.  J. C. FIDDYMENT  2,139,264
NUTCRACKER
Filed Dec. 21, 1935
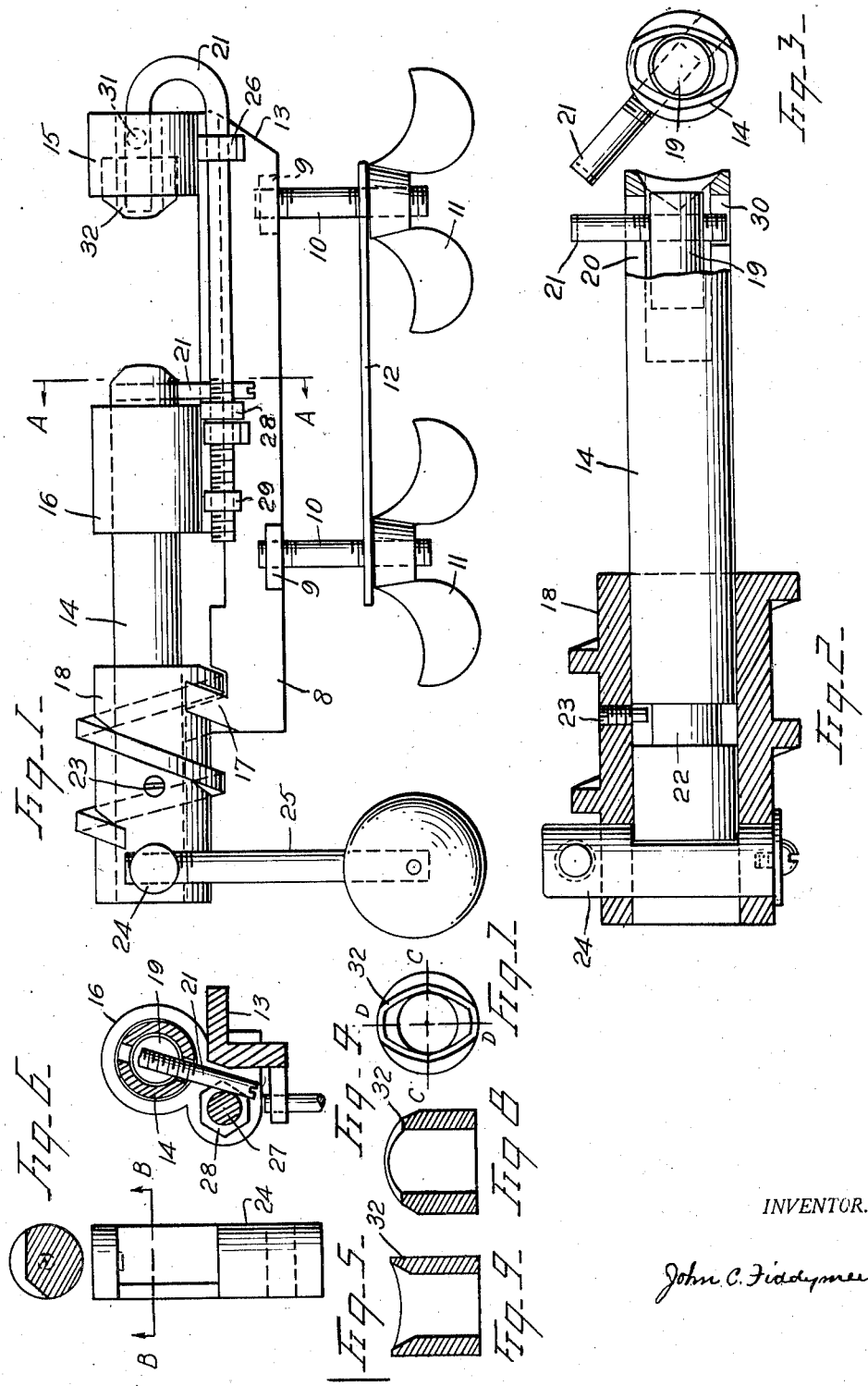
INVENTOR.
John C. Fiddyment Patented Dec. 6, 1938

2,139,264

UNITED STATES PATENT OFFICE 2,139,264

NUTCRACKER

John C. Fiddyment, Lockport, Ill.

Application December 21, 1935, Serial No. 55,636

3 Claims. (Cl. 146—16)

This invention relates to nut crackers, and its chief object is to provide a nut cracker especially designed to crack black walnuts speedily and produce a larger percentage of unbroken kernels and to take care of the different length and sizes of nuts with minimum effort.

The invention consists of parts of special construction and arrangement whereby the nut holding heads or jaws have an oval annular cutting edge concave on two sides, the lines of which conform as nearly as possible to the convex end of an average nut and will break the shell on both ends to the outward side of the enclosed kernels and in such a manner that the side shell will in most cases strip away from the kernel. The central internal structure around which the kernels form is not necessarily broken down thus avoiding as much as possible the mutilation of same. The jaws can be separated or brought together on a nut quickly, and when the nut is clamped between the jaws the cracking pressure can be applied to just the degree that is necessary to crack the shell and not mutilate the kernel.

The black walnut is a hard nut to crack so that the kernel is exposed for easy removal and not mutilated. The shell formation and thickness is very irregular and most of the nuts have a strong internal partition which divides the kernels in sections and which offer much resistance to crushing when the effort is applied directly on the ends, and if so done, the breaking down of the internal partitions tends to crush the kernels more or less. With this device the center of the nut is forced into the bore of the jaws the walls of which contact with the exterior of the nut away from its central end and tend to break the outer shell away from its internal structure without necessarily breaking same. This affords a more favorable condition for removal of the kernels without being crushed.

This invention will be best understood from a consideration of the following detailed description taken in connection with the accompanying drawing forming part of this specification, it being understood that the invention is not confined to any strict conformity with the showing of the drawing, but may be changed or modified as long as such changes or modifications mark no material departure from the salient features of the invention as expressed in the appended claims.

In the drawing—

Figure 1 is a side elevation of a nut cracker constructed in accordance with my invention for mounting on a table or like structure, the parts of the device being shown in the position they occupy when the movable jaw is retracted.

Figure 2 is a larger sized plan view of the movable jaw structure with part of the shell ejector showing in the cut away portion in position when the nut cracker is used for nuts whose outside shell diameter is such that they would press into the bore. It shows the adjusting head in section with the cracking pressure applying cam in position.

Figure 3 is an end view of the movable jaw structure showing the oval concave cutting edge formed by the removal of metal on two sides of the bore and on the other two sides on its outside surface, and also showing the shell ejector for same.

Figure 4 is a sectional view taken on line A—A of Figure 1 looking in the direction of the arrow, the adjusting head and handle and part of the structure for securing to support not being shown.

Figure 5 is a side view of the nut cracking pressure applying cam.

Figure 6 is a section on the line B—B of Figure 5.

Figure 7 is an end view of the die in the stationary jaw showing the annular concave nut cutting edge formed on the end of the tubular piece.

Figure 8 is a sectional view on line C—C of Figure 7 showing the removal of metal on two sides of its outer surface to form part of its oval concave cutting edge.

Figure 9 is a sectional view on line D—D of Figure 7 showing removal of metal of its bore on the other two sides to form its oval annular concave cutting edge.

Referring to the drawing, 8 indicates generally the body of the device, the lower part having two lugs 9 adapted to secure same to a support and being provided with threaded studs 10 and the wing nuts 11 with the plate 12 for attaching it to the corner of a table or other like support. Or it may be secured to a bench or rigid support by removing the plate 12 and using the studs 10 as bolts through the support. The body portion 8 is provided with a horizontal, laterally extending flange 13 which terminates at one end in an upwardly extending tubular support 15 which holds the die consisting of the stationary oval annular jaw of nut cutting member 32, the cutting edge of said member being symmetrically concave with relation to a chord connecting two points disposed 180° apart thereon, said chord being coincident with the long axis of the said cutting edge, as is most clearly shown in Figures 8 and 9.

About midway between the ends of the arm 13 is another upwardly extending tubular support 16 in which a tubular movable jaw operates. At the other end of the arm 13 on the upper side thereof is cast a lug 17 that constitutes a single thread nut for engagement with the thread on an adjusting head 18. The movable jaw structure 14 is recessed on the end thereof that opposes jaw member 32 and has formed thereon an oval annular concave nut cutting edge.

In the bore of jaw structure 14 shown by the dotted lines in Figures 1 and 2, operates a shell ejector 19, there being a slot 20 cut through the wall of the structure through which slot a stud 21 operates, said stud being secured to the shell ejector 19. Near the opposite end of the movable jaw structure 14 is a circumferential groove 22 into which a screw 23 protrudes to restrict the longitudinal movement of the jaw in relation to the adjustable head 18. At one end of the outside of the latter is formed a quick pitch thread which engages the nut 17 on arm 13. On one end portion of the head 18, beyond the end of jaw structure 14 therein, is formed a transverse bore in which is mounted a cam 24. The combination head and cam restricts any retrograde movement of the movable jaw structure 14 when under pressure, and the cam 24 is so formed that angular movement of same on its own axis imparts cracking pressure to the movable jaw structure 14. A handle 25 is secured to the cam 24 by which the adjusting head is revolved to advance or retract the movable jaw structure 14, or to rotate the cam 24 after a nut has been clamped between the movable and stationary jaw. On the side of the flange 13 is formed two projecting apertured lugs 26 in which is slideably mounted a shell ejector 27 that is associated with jaw 32, one end of ejector being threaded to receive two nuts 28 and 29. Nut 29 positioned on the opposite side of the rearmost lug 26 restricts the outward movement of the ejector and the nut 28 contacts the stud 21 in the movable structure 14 in arriving at the end of its outward position causing a movement of both shell ejectors to force out any shell that has broken off in either of the jaws.

30 is an opening cut through the wall of the movable jaw structure 14 on the opposite side to opening 20 into which the stud 21 can be inserted to limit the rearward movement of the shell ejector 19 when cracking small pecans or nuts that have a small shell diameter and thus prevent same from being forced further into the bore of the jaw. A set screw 31 is threaded through support 15 and engages the ejector 27 for securing same in determined position so that a small pecan or the small end of a nut will not enter too far for efficient cracking. The device is strong and durable and the operator may apply under complete control the force necessary to properly crack the nut with the least injury to the kernel in same. The cracker is also very efficient in cracking other than black walnuts.

To crack a nut the same is positioned against the stationary jaw 32, the end of the nut being central to the jaw, and as most of the nuts are more or less convex on their ends they fit fairly well against the oval annular convex cutting edge of the jaws. The nut is tightly clamped between the two jaws by bringing the movable jaw structure forward by revolving the adjustable head. The cracking pressure is applied by a partial revolution of the cam which will cause the nut to crack along the lines of the annular oval concave cutting edge of the jaws. If the cam movement is not sufficient to crack the nut properly, the adjusting head is again revolved enough to take up the cam movement and the cam is given another partial revolution. After the nut has been cracked the cam is brought back to neutral position and the adjusting head is revolved in the reverse direction which retracts the movable jaw structure, releasing the nut and contacting the shell ejectors so that any shell forced into the bore of either jaw is ejected.

When cracking butter nuts, small sized pecans, etc. the outside shell diameter of which would not prevent them being pressed too far in the bore of the jaws, the stud 21 is turned further through the shell ejector 19 so that the end of the stud will come through same into the slot 30 which will limit its rearward movement and the set screw 31 is clamped against the stationary jaw shell ejector holding same in the position desired. In cracking Brazil nuts, the best results are obtained by applying the pressure directly on the ends of same which is done by having the shell ejectors as outlined above.

Having described the invention, I claim:

1. In a nut cracker, a cracking jaw having an oval annular cutting edge that is concave with relation to a chord connecting two points disposed 180° apart therein, said chord being coincident with the long axis of the said cutting edge.

2. A nut cracking device comprising a tubular nut-engaging element of circular cross section, the nut-engaging end of said element being exteriorly beveled at two diametrically opposite regions, and interiorly beveled at two diametrically opposite regions 90° removed from said exteriorly beveled regions, to provide an annular, generally oval, nut-engaging edge.

3. A nut cracker comprising a cracking jaw having a substantially annular non-planar cutting edge that is symmetrically concave at two diametrically opposite regions thereof.

JOHN C. FIDDYMENT.